US011640345B1

(12) United States Patent
Ghosh et al.

(10) Patent No.: US 11,640,345 B1
(45) Date of Patent: May 2, 2023

(54) SAFE REINFORCEMENT LEARNING MODEL SERVICE

(71) Applicant: Amazon Technologies, Inc., Seattle, WA (US)

(72) Inventors: Neal Kishore Ghosh, Seattle, WA (US); Eric Benjamin Laber, Cary, NC (US)

(73) Assignee: Amazon Technologies, Inc., Seattle, WA (US)

( * ) Notice: Subject to any disclaimer, the term of this patent is extended or adjusted under 35 U.S.C. 154(b) by 377 days.

(21) Appl. No.: 16/875,791

(22) Filed: May 15, 2020

(51) Int. Cl.
  *G06F 11/00* (2006.01)
  *G06F 11/30* (2006.01)
  *G06N 5/04* (2023.01)
  *G06N 20/00* (2019.01)
  *G06F 18/2113* (2023.01)

(52) U.S. Cl.
  CPC .......... *G06F 11/30* (2013.01); *G06F 18/2113* (2023.01); *G06N 5/04* (2013.01); *G06N 20/00* (2019.01)

(58) Field of Classification Search
  CPC .......... G06N 20/00; G06N 5/04; G06F 11/30
  See application file for complete search history.

(56) References Cited

U.S. PATENT DOCUMENTS

| | | | |
|---|---|---|---|
| 7,305,373 B1 * | 12/2007 | Cunningham | G06N 5/022 706/47 |
| 10,839,310 B2 * | 11/2020 | Coppin | G06N 7/005 |
| 2020/0125586 A1 * | 4/2020 | Rezaeian | G06N 7/005 |
| 2020/0334641 A1 * | 10/2020 | Singh | G06N 20/00 |
| 2021/0089964 A1 * | 3/2021 | Zhang | G06V 10/774 |
| 2021/0241139 A1 * | 8/2021 | Jain | G06N 20/00 |
| 2021/0304027 A1 * | 9/2021 | Damodaran | G06N 20/00 |
| 2021/0353224 A1 * | 11/2021 | Etkin | G16H 40/67 |

* cited by examiner

*Primary Examiner* — Joshua P Lottich
(74) *Attorney, Agent, or Firm* — Knobbe, Martens, Olson & Bear, LLP

(57) ABSTRACT

Systems and methods are described for training a machine learning model to make a series of sequential decisions, in which the results of previous decisions are known prior to the next decision in the sequence being made. A safe reinforcement learning model estimates the results of choosing various options for a first decision in the sequence, and further estimates the amount of information that will be gained by choosing each of the options. The estimated information gain associated with each option is then used to forecast how the remaining decisions in the sequence would be improved by using the gained information to improve the prediction model and make better decisions. The safe reinforcement learning model further incorporates decision constraints provided by subject matter experts, which may set requirements for the selection such as a minimum required result and allow the safe reinforcement learning model to explore options within those constraints.

15 Claims, 5 Drawing Sheets

SAFE REINFORCEMENT LEARNING MODEL SERVICE

BACKGROUND

Generally described, computing devices can be used to facilitate decision-making. A machine learning model may be trained on previous decisions and their outcomes, and the machine learning model may then be used to predict outcomes of selecting various options for a pending decision. In a common aspect, a machine learning model may rank available options based on various attributes associated with each option. The machine learning model may then present the ranked options to a subject matter expert, who may then select one of the options and cause that option to be implemented.

The training of a machine learning model may be ongoing, such that the machine learning model is trained or retrained based on the measured results of its decisions. Such training or retraining may allow performance of the model to improve over time.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
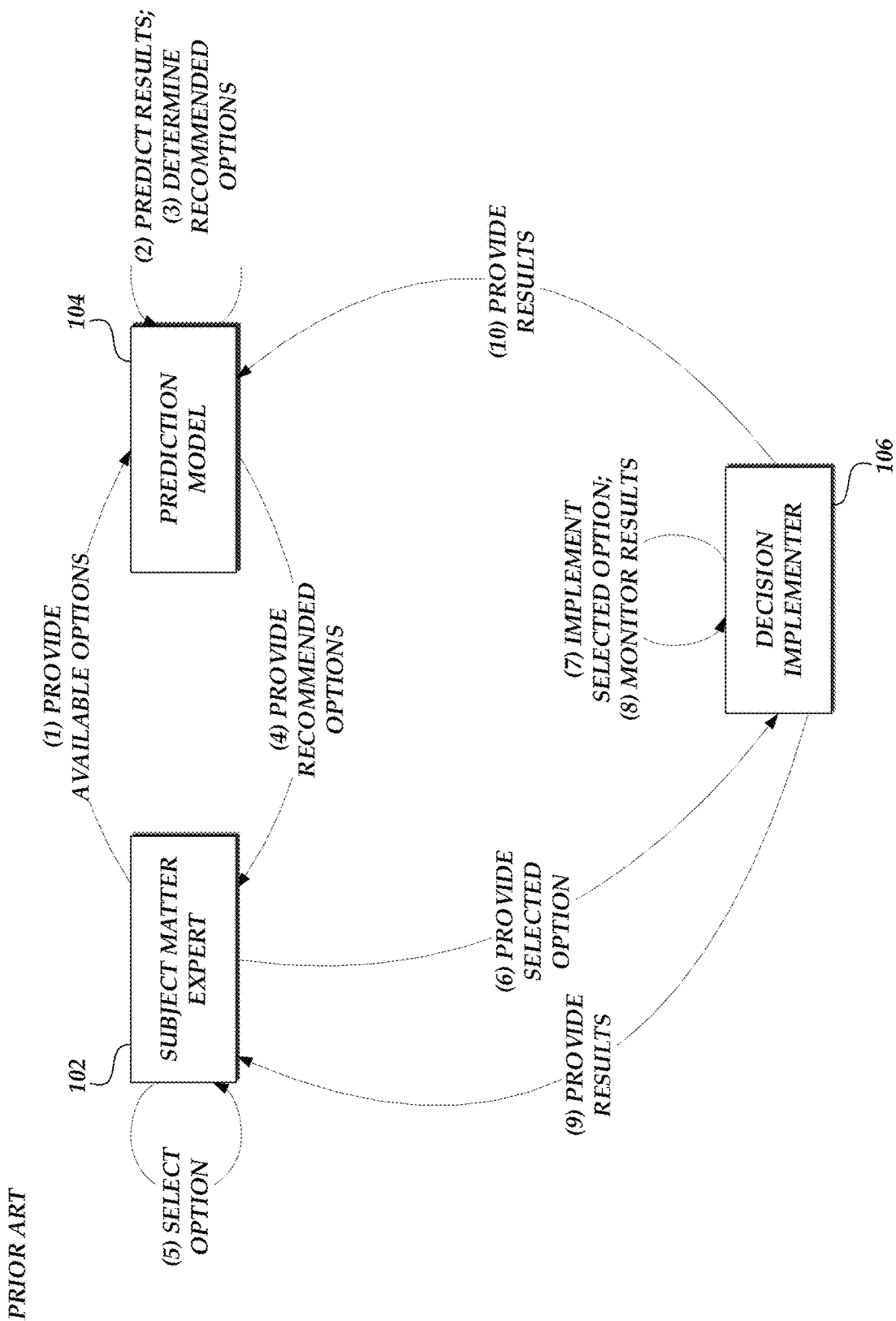
FIG. 1A is a flow diagram depicting example prior art interactions for sequential decision-making.

Generally described, aspects of the present disclosure relate to improving the performance of machine learning models. More specifically, aspects of the present disclosure are directed to systems, methods, and computer-readable media related to improving the performance of a machine learning model at the task of sequential decision making. As used herein, "sequential decision making" refers generally to a category of problems in which a series of decisions are made and the results of previous decisions are known at the time of the next decision in the series. For example, a medical practitioner treating a patient may make an initial treatment decision. The medical practitioner may apply the selected treatment, observe the results, and may then decide to continue the treatment or apply a different treatment depending on the observed results. As a further example, a retailer may order a set of items from a wholesaler, observe consumer demand for these items, and then place a subsequent order based on the observed demand. As a still further example, a municipality may decide on a location for a new branch of a public library system, observe patronage at the new branch library and at existing branch libraries, and then use that information when deciding whether and where to expand the library system further.

Machine learning models or other statistical models are typically used in sequential decision making to analyze a set of available options and provide recommendations to a subject matter expert, who then selects one of the options for implementation. The subject matter expert may apply domain expertise or other information that is not made directly available to the machine learning model when selecting from among the recommended options. For example, the machine learning model may recommend options for which products to stock on the shelves of a retail store, and the subject matter expert may have domain expertise regarding local conditions (e.g., a heat wave has caused certain items to be more popular) that are unknown to the machine learning model. The subject matter expert may therefore consider these additional factors when making a final selection from the options recommended by the machine learning model.

The subject matter expert or the machine learning model may deviate from their current "best guess" as to the option that will yield the highest result in the short term. For example, the machine learning model may use random perturbations or "forced explorations" to ensure sufficient information is gathered for model improvements. As a further example, a subject matter expert may choose to experiment with selections to improve their mental model and thereby improve their future decisions. However, explorations that are independently performed by the subject matter expert or by the machine learning model generally do not improve the performance of the other entity. That is, the machine learning model does not improve its performance based on experimentation by the subject matter expert, since the rationale behind the subject matter expert's decisions is not made available to the model. Further, the subject matter expert does not consider (and is generally unaware of) the possibility of improving the performance of the machine learning model by selecting a particular option. As such, prior art systems for sequential decision-making tend to make conservative decisions, and tend to maximize short-term gain (e.g., by making "safe" decisions with known results) at the expense of fully exploring the solution space and potentially finding options that produce better results.

To address these issues and improve the performance of a machine learning model at making sequential decisions, a safe reinforcement learning model service may be implemented and used. As described herein, a safe reinforcement learning model service may quantify the information gain associated with different options that could be selected when making a sequential decision, and may then forecast the results of using obtained additional information to improve the performance of the machine learning model at making later decisions in the sequence. The safe reinforcement learning model service may thus make better decisions by foregoing short-term results in order to obtain information that leads to better long-term results.

In some embodiments, the safe reinforcement learning model service may improve performance by incorporating the domain expertise of the subject matter expert as a set of decision constraints, which may constrain the options considered by the model or constrain the results that are considered acceptable. For example, the subject matter expert may create decision constraints that require the model to include certain items in a set of items to be selected, choose a location that is a minimum distance from other locations, specify a condition that must be satisfied (e.g., ice cream cones may be stocked only if ice cream is stocked), or other such criteria. As a further example, the subject matter expert may require that the predicted result associated with the selection made by the model satisfy a threshold. The machine learning model may thus incorporate the domain expertise of the subject matter expert into its decision-making, rather than having the subject matter expert apply their expertise in a manner that does not lead to improvements in the model.

The safe reinforcement learning model service may, in some embodiments, filter the set of available options to produce a set of feasible options. Illustratively, the set of available options may be exponentially large, such that a subject matter expert cannot practically review them all or even consider a representative set of recommendations. For example, determining the optimum set of content items to include in a video-on-demand service, or the optimum set of books to include at a branch library, may involve selecting a thousand items from a catalog of millions of possible items. The safe reinforcement learning model service may therefore filter the set of available options. In some embodiments, as described in more detail below, the safe reinforcement learning model service may determine a sequence of convex combinations of estimated result gain and estimated information gain, and may consider only a set of feasible options that correspond to the sequence of convex combinations. In further embodiments, the number of convex combinations to consider may be determined based on available computing resources, or may be specified by a user when making a request for a sequential decision.

It will be understood that the safe reinforcement learning model service described herein addresses a technical problem that specifically arises in the realm of computer networks, and in particular addresses a problem that arises in the realm of using a machine learning model for sequential decision-making. It will further be understood that the technical problem described herein is not analogous to any pre-Internet practice, and that the safe reinforcement learning model service improves the performance of a machine learning model by striking an improved balance between information-seeking and result-seeking. By implementing the safe reinforcement learning model service, an operator of a machine learning model may make better sequential decisions and achieve improved results.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A depicts example prior art interactions for sequential decision-making. The depicted interactions are typically performed for each decision in a sequence of decisions. At (1), a subject matter expert 102 provides a set of available choices or options to a prediction model 104, which at (2) predicts the results of implementing each of the available options. At (3), the prediction model 104 determines a set of recommended options out of the set of available options, and at (4) provides these options to the subject matter expert 102.

At (5), the subject matter expert 102 selects one of the recommended options. As described above, the subject matter expert 102 typically uses their own domain knowledge and expertise to make the selection from the recommended options, and may incorporate factors such as the risk tolerance of the subject matter expert 102 or the desire to obtain information about what the result would be if a particular choice were made. However, as discussed above, the decision-making process of the subject matter expert 102 is not made available to the prediction model 104 and therefore cannot be used to improve the performance of the prediction model 104. Instead, at (6), the option selected by the subject matter expert 102 is provided to a decision implementer 106, who at (7) implements the selected option.

At (8), the decision implementer 106 (or another entity) captures information that quantifies the results of implementing the decision. For example, the decision implementer 106 may capture an increase or decrease in a patient health indicator (e.g., cholesterol levels), a change in revenue, an amount of engagement or participation, or another metric that is affected by implementing the selected option. At (9) and (10), the decision implementer 106 provides these results to the subject matter expert 102 and the prediction model 104. The subject matter expert 102 and the prediction model 104 may thus separately incorporate the results of implementing the selected option into their respective selections and predictions. For example, the prediction model 104 may revise its forecasts for options that are similar to the selected option based on the actual measured results of implementing that option, and the subject matter expert may similarly revise their opinions. The interactions in FIG. 1A may then be repeated for a second decision in the sequence of decisions, a third decision, and so forth.

The prior art techniques thus enable a sequential decision-making process that incorporates both domain knowledge from a subject matter expert 102 and data-driven modeling from a prediction model 104. However, the prior art techniques are limited in their ability to incorporate domain knowledge into the prediction model 104, and the decisions made using these prior art techniques tend to maximize results based on the information currently available. According to such prior art techniques, neither the subject matter expert 102 nor the prediction model 104 prioritizes seeking additional information to improve later decisions— and, even if one of these actors does prioritize information-seeking, their goal is not communicated to the other actor and so is less likely to be achieved. The prior art techniques are also unable to scale to decisions that have millions of possible options. For example, the number of products stocked by a retail store may number in the thousands, and the number of available products that could be stocked by the retail store may number in the millions. The set of available options may thus be exponentially large, and neither the prediction model 104 nor the subject matter expert 102 may be able to practically evaluate more than a fraction of the options.

Figure 1B:
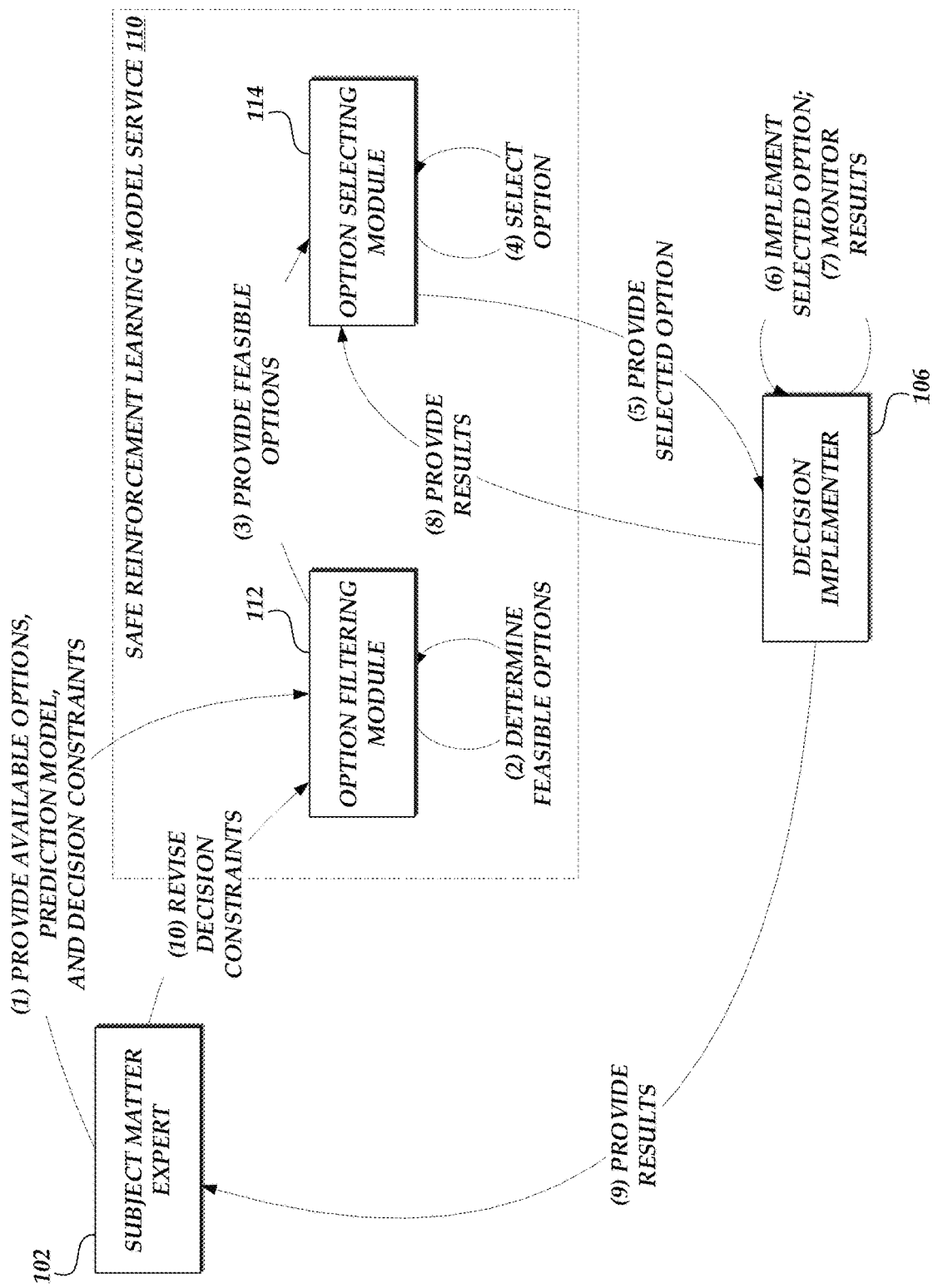
FIG. 1B is a flow diagram depicting example interactions for sequential decision-making using a safe reinforcement learning model service in accordance with aspects of the present disclosure.

Accordingly, to address these shortcomings and make better sequential decisions, a safe reinforcement learning model service may be utilized as described herein. FIG. 1B depicts example interactions with a safe reinforcement model learning service 110 in accordance with aspects of the present disclosure. As depicted, the interactions may begin at (1), where a subject matter expert 102 (or another source) may provide a set of available options, a prediction model (e.g., the prediction model 104 depicted in FIG. 1A), and a set of decision constraints that codify and represent the domain knowledge of the subject matter expert 102. These inputs may be provided to an option filtering module 112, or, in some embodiments, any or all of the inputs (e.g., the decision constraints or the prediction model) may be provided to an option selecting module 114 instead of or in addition to the option filtering module 112.

At (2), as described below with reference to FIG. 2, the option filtering module 112 may determine a set of feasible options from within the set of available options. Illustratively, the option filtering module 112 may determine a set of feasible options that correspond to convex combinations in a series. For example, the option filtering module 112 may determine options that correspond to 100% result seeking and 0% information seeking, 90% result seeking and 10% information seeking, 80% result seeking and 20% information seeking, and so forth. As described in more detail below, the option filtering module 112 may use result estimators and information gain estimators to identify options that maximize the value of various convex combinations. At (3), the option filtering module 112 may provide the set of feasible options to an option selecting module 114.

At (4), as described below with reference to FIG. 3, the option selecting module 114 may select one of the feasible options. Illustratively, the option selecting module 114 may make its selection by modeling the effects of selecting a given option on later decisions in the sequence, and then determining which of the feasible options leads to the best cumulative result. In various embodiments, the option selecting module 114 may use restricted contextual bandit algorithms, Monte Carlo rollouts under a fixed rollout strategy (e.g., revenue-greedy), convex composite utility, or other techniques for estimating an optimal selection. For example, the option selecting module 114 may estimate the information gained by selecting a particular option, estimate the resulting improvement in the performance of the prediction model, and then simulate using the improved prediction model to make the remaining decisions in the sequence.

At (5), the option selecting module 114 provides the selected option to a decision implementer 106. In some embodiments, the selected option may represent a subset or collection of options rather than being a single option. For example, the sequential decision may be to determine an optimal set of items to stock on the shelves of a retail store, and the selected option may be a set of such items. As a further example, the sequential decision may be to determine a treatment for a patient, and the selected option may represent more than one medical treatment (e.g., a medication plus physical therapy). At (6), the decision implementer 106 implements the selected option.

At (7), the decision implementer 106 (or, in some embodiments, another entity) may collect one or more metrics that are used to measure the results of the decision. For example, the metric may be an amount of resource utilization, a medical statistic (e.g., body temperature, blood glucose level, cholesterol level, weight, etc.), an amount of profit or revenue, a measure of engagement (e.g., number of patrons, percentage of workstations in use, etc.), or other such measures. Accordingly, the metric may represent a measure of utility gained from a decision or action (separate from the information gained). In some embodiments, results may be measured relative to their values prior to implementation of the selected option (e.g., the collected measurement may be an increase or decrease caused by implementing the selected option).

At (8), the decision implementer 106 provides the results to the option selection module 114, which may use them to improve the performance of the prediction model. For example, the option selection module 114 may adjust the parameters of the prediction model such that its output reflects the measured results, or may train the prediction model using machine learning techniques. In some embodiments, the option selection module 114 may interact with the prediction model via an application programming interface ("API") or software development kit ("SDK") that supports tuning or training of prediction models. Additionally, in some embodiments, the decision implementer 106 may provide the results to the option filtering module 112, which may refine its determinations of feasible options accordingly.

At (9), the decision implementer 106 provides the results to the subject matter expert 102, who in some embodiments may, at (10), revise the decision constraints to cause the safe reinforcement learning model service 110 to make certain selections more or less likely. Illustratively, the subject matter expert 102 may introduce new decision constraints based on the selected option and/or the results. For example, the subject matter expert 102 may require that a percentage of books stocked at a bookstore must be related to local interests, or that a store location must be predicted to generate a threshold amount of revenue. In some embodiments, the subject matter expert 102 may specify "input" and "output" constraints separately. For example, the subject matter expert 102 may specify that certain seasonal items (e.g., air conditioners, winter clothing, etc.) must be included in the set of items selected when stocking a retail store, and may further specify that the selected option must generate a threshold result (e.g., a specified profit margin, minimum data throughput, etc.).

In some embodiments, the subject matter expert 102 may specify a series of decision constraints in advance, such that a first constraint (or set of constraints) is applied to a first decision in the sequence, a second constraint is applied to a second decision, and so forth. In other embodiments, the option selecting module 114 may recommend a number of options to the subject matter expert 102 and may indicate the trade-off between short-term results and longer-term information gain for each recommended option.

It will be understood that FIG. 1B is provided for purposes of example, and that many variations on the depicted interactions are within the scope of the present disclosure. For example, the subject matter expert 102 may interact with a user interface module (e.g., the user interface module 424 depicted in FIG. 4) to provide decision constraints and other inputs, or the safe reinforcement learning model service 110 may retrieve the available options from a data store. FIG. 1B is thus understood to be illustrative and not limiting.

Figure 2:
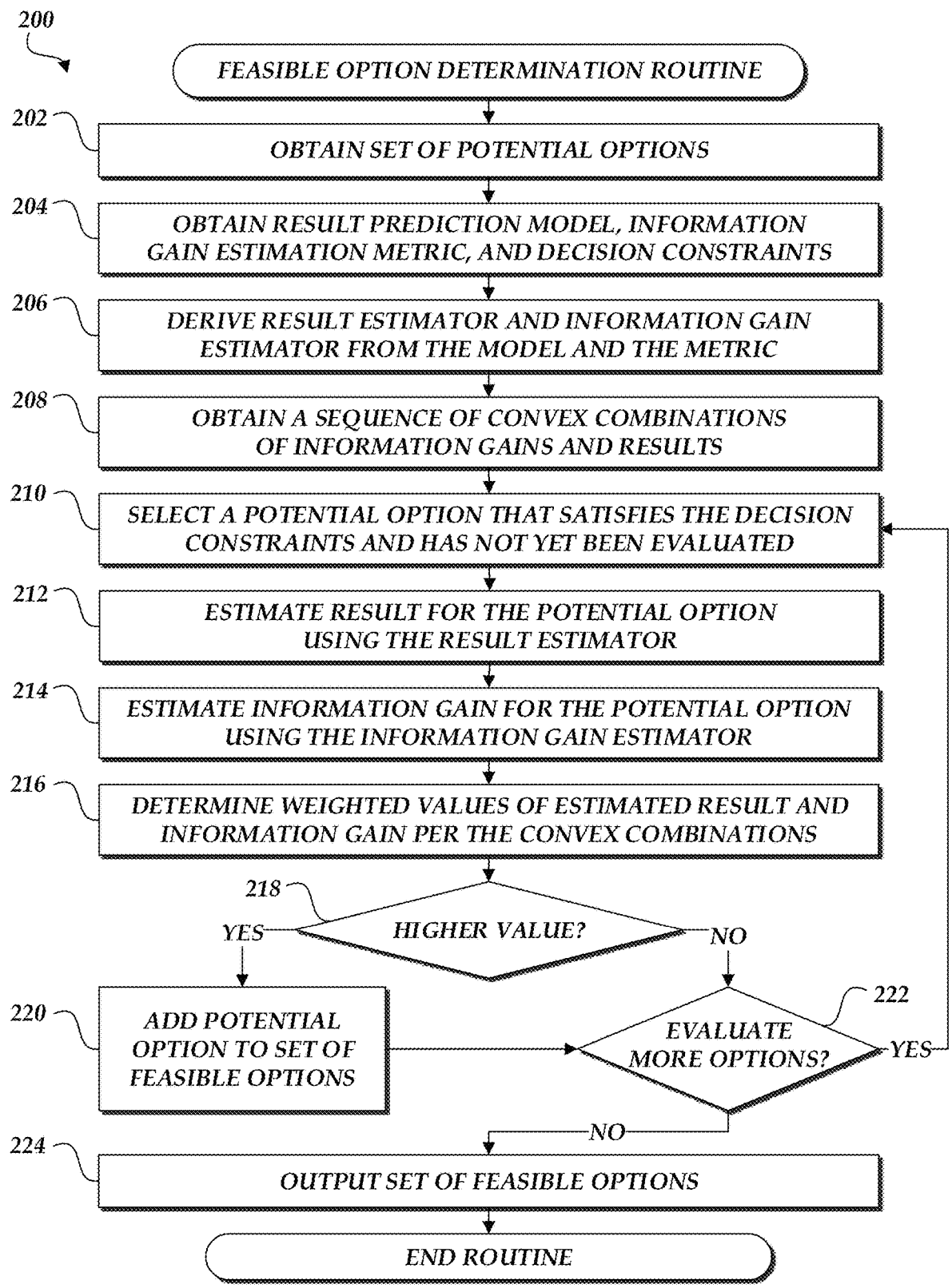
FIG. 2 is a flowchart depicting an example routine for filtering a set of available options to determine which of them are feasible candidates in accordance with aspects of the present disclosure.

FIG. 2 is a flow chart depicting an example routine 200 for selecting a set of feasible options from a larger set of available options. The routine 200 may be carried out, for example, by the option filtering module 112 depicted in FIG. 1B. The routine 200 begins at block 202, where a set of available potential options may be obtained. In some embodiments, the set of available options may be defined in terms of criteria. For example, the set of potential locations for a weather station may be defined in terms of a geographic region, or the set of potential prices for a consumer good may be specified as a range. In some embodiments, the set of potential options may be obtained from a data store.

At block 204, a prediction model, information gain estimation metric, and decision constraints may be obtained. The prediction model may illustratively be any model that can be used to predict results and that can be trained, tuned, or otherwise modified to incorporate additional information as it becomes available. For example, the prediction model may be a machine learning model trained on the geographic locations and total annual revenue of each of a number of coffee shops, and may be used to predict revenue at a new store location. In some embodiments, obtaining the prediction model may refer to receiving (such as from an expert or other user) a reference to a location from which the model may be accessed, such as in the case of a model accessible via a network-based machine learning service. The information gain estimation metric may be any metric that can be used to quantify information gain. For example, the metric may measure a reduction in mean squared deviation or the Kullback-Leibler divergence between the sampling distribution of the predictive model before and after an option is selected and the subsequent result is observed. The decision constraints may be any constraints on what is considered a feasible option, and in various embodiments may reflect practical considerations and/or the domain expertise of a subject matter expert or experts. For example, the set of available potential options may be a set of commercial office spaces, and the decision constrains may include a minimum square footage and that the space is available for lease during a specified timeframe. As a further example, the decision constraints may specify that a threshold percentage of the articles to be included in a newspaper must relate to local sports.

At block 206, a result estimator and an information gain estimator may be derived from the prediction model and metric obtained at block 204. In general, the result estimator and information gain estimator may be any functions that can be computed efficiently for a large number of potential options, and that provide a relatively accurate approximation of the predicted results and predicted information gain that may be obtained using the full model. For example, the estimator may be a linear estimator that maps attributes of an option to a numerical value, or that maps a set of options to a numerical value based on weighted combinations of the individual attributes or options. It will be understood that the result estimator and the information gain estimator will generally be more efficient to compute (e.g., they will require less time or fewer computing resources) than applying the prediction model and determining the information gain, but will produce less accurate results. In some embodiments, the result estimator or the information gain estimator may be obtained (e.g., at block 204) rather than being derived. In other embodiments, a default estimator or information gain estimator may be used.

In some embodiments, a result estimator and an information gain estimator may be derived by estimating the per-component change in result and information gain associated with adding or deleting a component to a reference selection (e.g., adding or removing an item from a reference set of items to be stocked at a grocery store). Because other components are held fixed at a reference level, the per-component change can be estimated in parallel and thus the procedure can scale to problems with a large number of components. Per-component change can then be aggregated, e.g., by summing relevant per-component changes, to estimate total utility and information gain for any candidate selection. Certain aggregation methods, e.g., taking a weighted sum, lead to expressions of total utility and information gain that can be easily optimized. Thus, optimizing convex combinations of total utility and information gain constructed using such aggregators can be optimized over all allowable selections. To improve solution quality, the estimated optimal selection for a given convex combination can then be used as a new reference selection and the process can be repeated.

At block 208, a sequence of convex combinations of information gains and result improvements may be obtained. Illustratively, the sequence of convex combinations may be defined by specifying a sequence of M numbers $\lambda_1, \lambda_2, \ldots, \lambda_M \in [0,1]$, each of which corresponds to a convex combination $\lambda_i Q (X_c: c \in S) + (1-\lambda_i) E(X_c: c \in S)$, where Q is the result estimator function, E is the information gain estimator function, and $X_c$ is an available option from the set of available options S. For example, the sequence of M numbers may be 0.1, 0.2, 0.3, and so forth, and the sequence of convex combinations may be weighted 10% toward revenue gain and 90% toward information gain, 20% toward revenue gain and 80% toward information gain, and so forth. In some embodiments, the number of terms to include in the sequence, and thus the size of the set of feasible options, may be specified at block 204 (e.g., as part of a request to make a sequential decision). In other embodiments, the size of the set of feasible options may be determined based on factors such as time, available computing resources, or other factors.

At block 210, a potential option that satisfies the decision constraints and that has not yet been evaluated (i.e., compared to the sequence of convex combinations) may be selected. At block 212, the result for the potential option may be estimated using the result estimator, and at block 214 the information gain for the potential option may be estimated using the information gain estimator. At block 216, the values obtained at blocks 212 and 214 may be used to determine the sequence of convex combinations for the selected option—that is, $\lambda_i Q(X_c: c \in S) + (1-\lambda_i) E(X_c: c \in S)$ may be calculated for each $\lambda_i$ in the sequence of M numbers, where the values obtained at blocks 212 and 214 are $Q(X_c: c \in S)$ and $E(X_c: c \in S)$ respectively for the selected options $X_c$.

At decision block 218, a determination may be made as to whether the selected option produces a higher value of $\lambda_i Q(X_c: c \in S) + (1-\lambda_i) E(X_c: c \in S)$ than any previously evaluated option for any $\lambda_i$ in the sequence of M numbers. If so, then at block 220 the selected option may be added to the set of feasible options. In some embodiments, as the routine 200 iterates through blocks 210 to 222, a previously selected option may be removed from the set of feasible options when the currently selected option is added, since the option that is currently being evaluated may produce a higher value for a given) than the previous option. It will be understood that the first iteration of blocks 210 to 222 will always add the option selected at block 210 to the set of feasible options, and that subsequent iterations of blocks 210 to 222 will evaluate whether later options produce a higher value than the option selected in the first iteration for any given) in the sequence. The routine 200 thus identifies, from among the options that are iteratively selected at block 210, the set of options that maximize the value of $\lambda_i Q(X_c: c \in S) + (1-\lambda_i) E(X_c: c \in S)$ for each $\lambda_i$ in the sequence.

If the determination at decision block 218 is that the selected option is less feasible than other options that have been evaluated, or after the selected option is added to the set of feasible options at block 220, the routine 200 proceeds to decision block 222, where a determination may be made as to whether more options should be evaluated. In some embodiments, the determination may be as to whether there are more options available to evaluate. In other embodiments, the number of available options may be sufficiently large (e.g., each of the options is a different selection of a thousand items from a pool of one million items) that evaluating all of the available options would be impractical. The determination may thus be, for example, whether a threshold number of options have been evaluated, whether a representative sample of the available options have been evaluated, whether a threshold amount of computing resources have been consumed, whether the set of feasible options satisfies a criterion, or other such criteria. If the determination at decision block 222 is that more options should be evaluated, then the routine 200 branches to block 210, selects another option to evaluate, and iterates until the criterion at decision block 222 has been satisfied.

If the determination at decision block 222 is that no further options should be evaluated, then at block 224 the set of feasible options may be output. In some embodiments, the set of feasible options may be output to a further routine, such as the routine 300 described with reference to FIG. 3 below.

In some embodiments, the routine 200 may be used to select a number of options from a set of available options. For example, each of the available options may be a geographic location that represents a bus stop or a potential bus stop. The routine 200 may thus be used to identify feasible bus routes, with each of the identified feasible routes containing two or more stops from the set of available bus stops. As a further example, each of the available options may correspond to a movie or other content available to an entertainment service, and the routine 200 may be used to identify feasible sets of content that the entertainment service could deliver to subscribers. In other embodiments, the routine 200 may be used to select individual feasible options from the set. For example, the routine 200 may be used to identify feasible locations for a store or feasible prices for a product. In further embodiments, the routine 200 may be used to identify sets of options that are feasible, such as feasible configurations for a computing device (e.g., a quantity of memory, a processor speed, etc.), feasible meal plans, and the like.

In some embodiments, the routine 200 may obtain a sequence of convex combinations of result, information gain, and one or more other parameters. For example, the convex combinations may combine result and information gain with volatility, risk, uncertainty, side effects, availability, administrative overhead, travel distance, implementation costs, training or retraining costs, net change, or other parameters to be minimized or maximized. The routine 200 may thus determine a set of feasible options across three or more dimensions of a problem space, and may identify a set of tradeoffs to consider between, e.g., maximizing results, maximizing information gain, and minimizing medical side effects. In further embodiments, parameters such as net change or implementation costs may be implemented as a combination of decision constraints and convex combinations. For example, the routine 200 may obtain a decision constraint that sets a maximum implementation cost, and then consider different convex combinations of information gain, result, and implementation cost within the constraint.

It will be understood that FIG. 2 is provided for purposes of example, and that many variations on the routine 200 are within the scope of the present disclosure. For example, blocks 202 and 204 may be carried out in either order or in parallel. As a further example, block 208 may be carried out at any time prior to block 216, including being carried out prior to execution of the routine 200. The depicted routine 300 is thus understood to be illustrative and not limiting.

Figure 3:
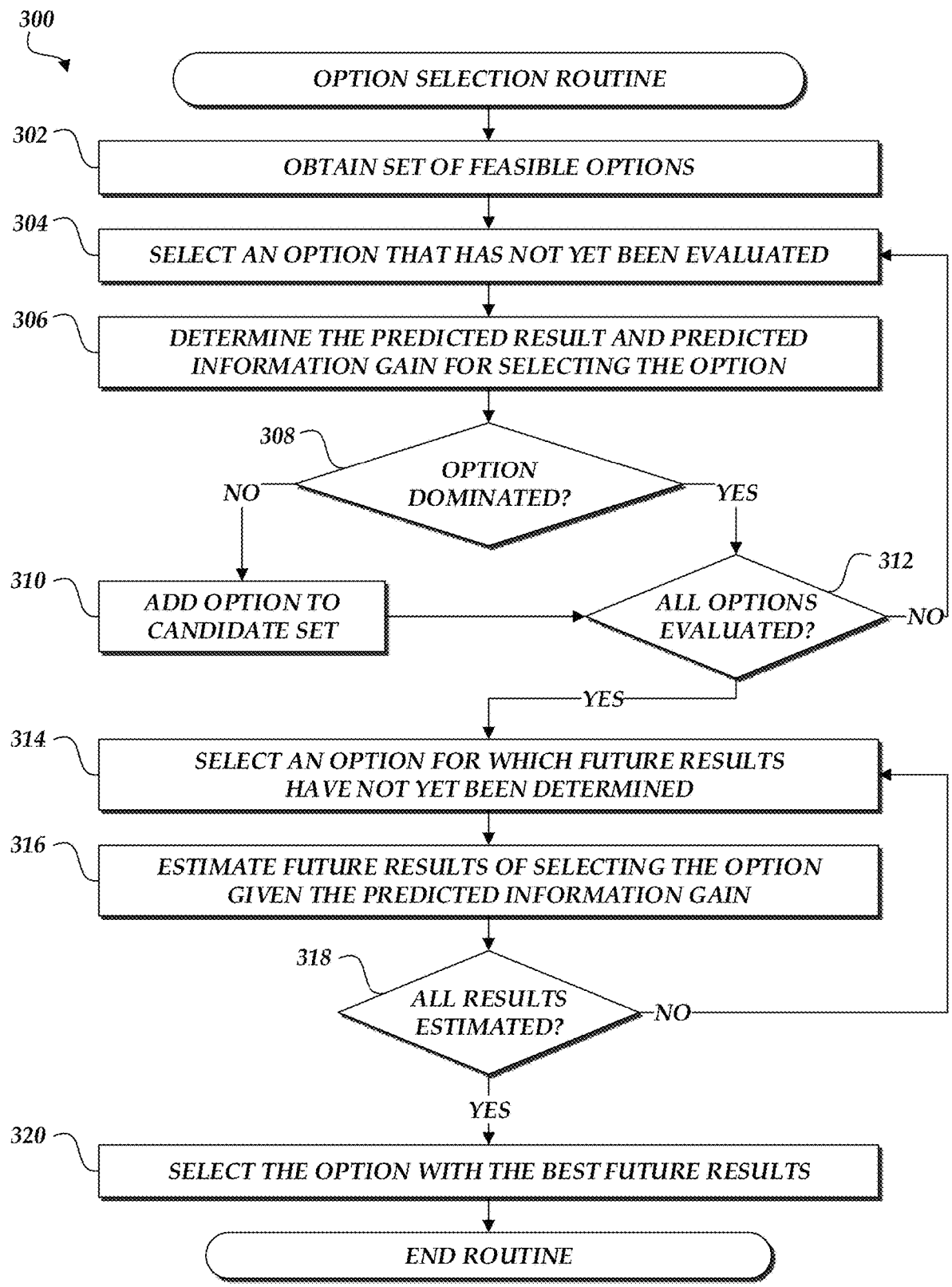
FIG. 3 is a flowchart depicting an example routine for selecting an option from a set of candidate options based on the predicted result of the selection and the predicted information gain of the selection, in accordance with aspects of the present disclosure.

FIG. 3 is a flow chart depicting an illustrative routine 300 for selecting an option from a set of feasible options in accordance with aspects of the present disclosure. The routine 300 may be carried out, for example, by the option selecting module 114 depicted in FIG. 1B. The routine 300 begins at block 302, where a set of feasible options may be obtained. The set of feasible options may be obtained, for example, by carrying out the routine 200 with a set of available options. At block 304, an option (from the set of feasible options) that has not yet been evaluated as part of routine 300 may be selected.

At block 306, a predicted result of selecting the option and a predicted information gain from selecting the option may be determined. Illustratively, the result may be predicted using a prediction model that is trained on previously selected options, as described above. In some embodiments, the prediction model may be obtained by the routine 300 or provided to the routine 300 as an input. The predicted information gain may similarly be determined as described above.

At decision block 308, a determination may be made as to whether the option selected at block 304 is dominated by another option. An option is said to be "dominated" if another option in the set of feasible options has both a same or better predicted result and a same or higher predicted information gain. Accordingly, if an option is dominated, then it would always be advantageous to select the option that dominates instead, and therefore the option that is dominated should not be considered further. As such, if the determination at decision block 308 is that the option being evaluated is not dominated, then at block 310 the option is added to the candidate set for further evaluation. If the determination at decision block 308 is that the option is dominated, or after the non-dominated option has been added to the candidate set, the routine 300 continues at decision block 312, where a determination is made as to whether all options in the set of feasible options have been evaluated. If not, the routine 300 branches to block 304, selects a new feasible option, and iterates until all of the feasible options have been evaluated.

When the determination at decision block 312 is that all options have been evaluated, the routine 300 branches to block 314, where an option from the candidate set is selected that has not yet had its future results determined. At block 316, results may be estimated for future decisions in the series of sequential decisions. Illustratively, the results for future decisions may be estimated based on the assumption that the information gained from choosing the selected option will be used to improve the prediction model. The gain that can be realized by improving the prediction model in early rounds of the sequential decision-making process may thus be estimated. Illustratively, a Monte Carlo rollout can be used to estimate results for the sequence of future decisions if a greedy policy is used for future selections.

At decision block 318, a determination may be made as to whether future results have been estimated for all of the options in the candidate set. If not, then the routine 300 branches to block 314, selects another option, and iterates until future results have been estimated for all of the options. With the determination at decision block 318 is that future results have been estimated for all options in the candidate set, the routine 300 branches to block 320, where the option with the best estimated future results is selected.

In some embodiments, the routine 300 may estimate the future results of outputting a particular result (i.e., as the result selected by the routine 300) rather than the future results of implementing the selected result. For example, if a decision implementer consistently under-implements or over-implements the result selected by the routine 300 (e.g., if a medical patient consistently fails to implement all or part of the treatment options selected by the routine 300), then the routine 300 may select options in subsequent rounds of the sequential decision-making process that account for the disparity between the recommendation and the implementation. For example, the safe reinforcement learning model service 110 may effectively conclude that a particular treatment that is recommended but not implemented is ineffective (based on the lack of results), and may thus select an alternative treatment It will be understood that FIG. 3 is provided for purposes of example, and that many variations on the routine 300 are within the scope of the present disclosure. For example, options may be removed from the set of feasible options rather than being added to a separate set of candidate options when it is determined that an option is dominated. As a further example, the routine 300 may output information regarding the selected option, such as the estimated value of the information gained by making the selected option, and how this estimated value compares to making a different selection (e.g., a "greedy" selection of the option that produces the highest result in the short term). The depicted routine 300 is thus understood to be illustrative and not limiting.

Figure 4:
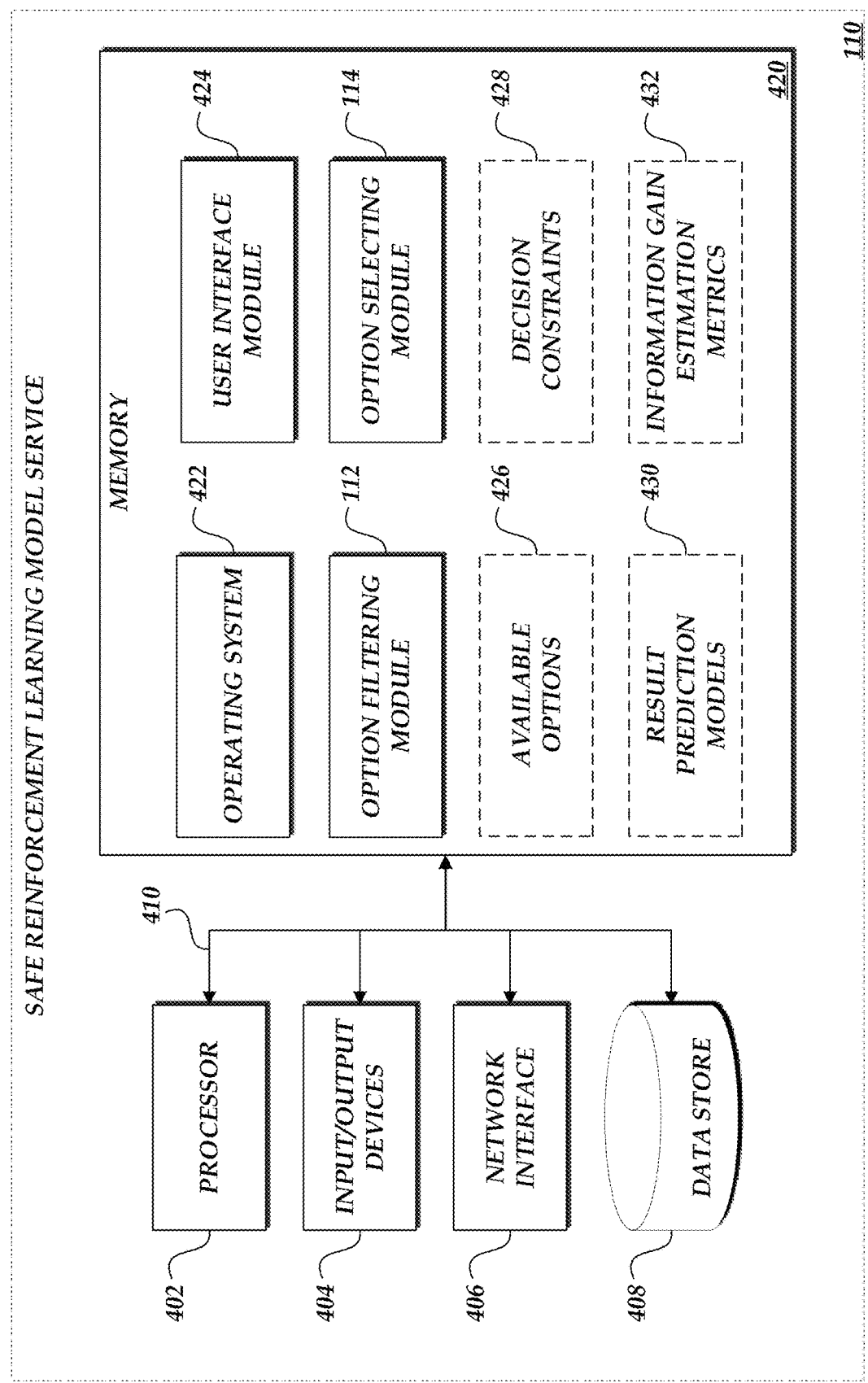
FIG. 4 depicts a general architecture of a computing device implementing a safe reinforcement learning model service in accordance with aspects of the present disclosure

FIG. 4 depicts a general architecture of the safe reinforcement learning model service 110, which includes an arrangement of computer hardware and software configured to implement aspects of the present disclosure. The safe reinforcement learning model service 110 may include many more (or fewer) elements than those shown in FIG. 4. It is not necessary, however, that all of these elements be shown in order to provide an enabling disclosure.

As illustrated, the safe reinforcement learning model service 110 includes a processor 402, input/output devices 404, a network interface 406, and a data store 408, all of which may communicate with one another by way of a communication bus 410. The network interface 406 may provide connectivity to one or more networks or computing systems and, as a result, may enable the safe reinforcement learning model service 110 to receive and send information and instructions from and to other computing systems or services. In some embodiments, the safe reinforcement learning model service 110 may be configured to process requests from other devices or modules, such as requests to initiate network communications. The data store 408 may illustratively be any non-transitory computer-readable data store, and in various embodiments may store any or all of the elements that are depicted in FIG. 4 as being loaded into a memory 420.

The processor 402 may also communicate to and from the memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the safe reinforcement learning model service 110. The memory 420 may further store specific computer-executable instructions and other information (which may be referred to herein as "modules" or "engines") for implementing aspects of the present disclosure. For example, the memory 420 may include the option filtering module 112 and the option selecting module 114, which may implement aspects of the present disclosure as described above. The memory 420 may further include, for example, available options 426, decision constraints 428, result prediction models 430, and information gain estimation metrics 432, which may be loaded into the memory 420 as various operations are performed.

While the operating system 422, user interface module 424, option filtering module 112, and option selecting module 114 are illustrated as distinct modules in the memory 420, in some embodiments, the user interface module 424, option filtering module 112, and option selecting module 114 may be incorporated as a module or modules in the operating system 422 or another application or module, and as such, separate modules may not be required to implement some embodiments.

It will be recognized that many of the components described in FIG. 4 are optional and that embodiments of the safe reinforcement learning model service 110 may or may not combine components. Furthermore, components need not be distinct or discrete. Components may also be reorganized. For example, the safe reinforcement learning model service 110 may be represented in a single physical device or, alternatively, may be split into multiple physical devices. In some embodiments, components illustrated as part of the safe reinforcement learning model service 110 may additionally or alternatively be included in other computing devices, such that some aspects of the present disclosure may be performed by the safe reinforcement learning model service 110 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computer-implemented method comprising:
    under control of a computing device configured with specific computer-executable instructions,
    receiving a request to make a first decision in a sequence of decisions, wherein the first decision is selected from a plurality of available options;
    obtaining an information gain metric, wherein the information gain metric is usable to measure a quantity of information gained from selecting an option from the plurality of available options;
    for individual options of the plurality of available options:
        determining, from a machine learning prediction model, a predicted result of selecting the individual option as a decision in the sequence of decisions; and
        measuring, using the information gain metric, a predicted quantity of information gained from selecting the individual option as a decision in the sequence of decisions;
    identifying, based at least in part on the predicted results of selecting the individual options and the predicted quantities of information gained from selecting the individual options, a set of feasible options within the plurality of available options, wherein each feasible option in the set of feasible options corresponds to a convex combination in a series of convex combinations of the predicted results and the predicted quantities of information gained;
    determining, for individual feasible options of the set of feasible options, a predicted result for the sequence of decisions if the individual feasible option is selected as the first decision, wherein determining the predicted result for the sequence of decisions includes modeling an effect, on the sequence of decisions, of selecting the individual feasible option as the first decision;
    selecting, from the set of feasible options, a feasible option with a highest predicted result for the sequence of decisions as the first decision;
    causing implementation, in the sequence of decisions, of the first decision;
    quantifying a result of the implementation, in the sequence of decisions, of the first decision;
    training the machine learning prediction model with the quantified result of the implementation, in the sequence of decisions, of the first decision; and
    selecting, from the set of feasible options and based at least in part on the predicted results from the machine learning prediction model that has been trained, a second feasible option to implement as a second decision in the sequence of decisions.

2. The computer-implemented method of claim 1, wherein identifying the set of feasible options comprises identifying, for each of a sequence of convex combinations of predicted results and predicted quantities of information gained, an option that corresponds to the convex combination based at least in part on the predicted result and the predicted quantity of information gained.

3. The computer-implemented method of claim 1, wherein an individual option comprises an attribute value.

4. The computer-implemented method of claim 3, wherein determining, from the machine learning prediction model, the predicted result of selecting the individual option as a decision in the sequence of decisions is based at least in part on the attribute value for the individual option.

5. The computer-implemented method of claim 1 further comprising deriving a result estimator based at least in part on the machine learning prediction model, wherein determining the predicted result of selecting the individual option as a decision in the sequence of decisions comprises applying the result estimator to the individual option.

6. The computer-implemented method of claim 1, wherein identifying the set of feasible options comprising determining that an individual feasible option in the set of feasible options satisfies a decision constraint.

7. The computer-implemented method of claim 1 further comprising determining that a predicted result for the first decision satisfies a threshold.

8. The computer-implemented method of claim 1 further comprising obtaining an updated set of decision constraints based at least in part on the quantified result of the implementation of the first decision.

9. The computer-implemented method of claim 1, wherein the information gain metric comprises at least one of a mean squared deviation or a Kullback-Leibler divergence.

10. The computer-implemented method of claim 1, wherein determining, for individual feasible options of the set of feasible options, the predicted result for the sequence of decisions comprises determining a possible expected-result for each decision in the sequence of decisions.

11. A non-transitory computer-readable medium storing computer-executable instructions that, when executed by a processor, configure the processor to perform operations including:
  obtaining a plurality of available options to be implemented as a first decision in a sequence of decisions;
  for individual options of the plurality of available options:
    determining, from a machine learning prediction model, a predicted result of selecting the individual option as a decision in the sequence of decisions; and
    measuring, using an information gain metric, a predicted quantity of information gained from selecting the individual option as a decision in the sequence of decisions;
  identifying, based at least in part on the predicted results of selecting the individual options and the predicted quantities of information gained from selecting the individual options, a set of feasible options within the plurality of available options, wherein each feasible option in the set of feasible options corresponds to a convex combination in a series of convex combinations of the predicted results and the predicted quantities of information gained;
  determining, for individual feasible options of the set of feasible options, a predicted result for the sequence of decisions if the individual feasible option is selected as the first decision, wherein determining the predicted result for the sequence of decisions includes modeling an effect, on the sequence of decisions, of selecting the individual feasible option as the first decision;
  selecting, from the set of feasible options, a feasible option with a highest predicted result for the sequence of decisions as the first decision;
  causing implementation, in the sequences of decisions, of the first decision; quantifying a result of the implementation, in the sequence of decisions, of the first decision;
  training the machine learning prediction model with the quantified result of the implementation, in the sequence of decisions, the first decision; and
  selecting, from the set of feasible options and based at least in part on the predicted results from the machine learning prediction model that has been trained, a second feasible option to implement as a second decision in the sequence of decisions.

12. The non-transitory computer-readable medium of claim 11, wherein the computer-executable instructions further configure the processor to perform operations including determining, based at least in part on an available quantity of a computing resource, a number of feasible options to include in the set of feasible options.

13. The non-transitory computer-readable medium of claim 11, wherein the predicted result of selecting the individual option comprises at least one of predicted resource utilization, predicted patient benefit, predicted engagement level, predicted revenue, or predicted profit.

14. The non-transitory computer-readable medium of claim 11, wherein an individual option of the plurality of available options comprises at least one of: a first subset of a plurality of items, a geographic location, a medical treatment, a price, or a delivery route.

15. The non-transitory computer-readable medium of claim 11, wherein the computer-executable instructions further configure the processor to perform operations including selecting, from the set of feasible options and based at last in part on the predicted results from the machine learning prediction model that has been trained, a third feasible option to implement as a third decision in the sequence of decisions.

* * * * *